United States Patent [19]
Ashton et al.

[11] 3,983,883
[45] Oct. 5, 1976

[54] GRAIN SAVING APPARATUS

[75] Inventors: Robert Ashton, Islington; Wilbert D. Weber, Mississauga, both of Canada

[73] Assignee: Massey-Ferguson Industries Limited, Toronto, Canada

[22] Filed: Apr. 10, 1975

[21] Appl. No.: 566,845

[52] U.S. Cl. .................................. 130/24; 130/27 P
[51] Int. Cl.² ......................................... A01F 12/30
[58] Field of Search .................. 130/21, 22 R, 22 A, 130/23, 24, 25, 26, 27 R, 27 G–27 L, 27 N, 27 P, 27 Q

[56] References Cited
UNITED STATES PATENTS

| | | | |
|---|---|---|---|
| 482,554 | 9/1892 | Galland | 130/27 P |
| 838,032 | 12/1906 | Kleker | 130/24 |
| 901,588 | 10/1908 | Brown | 56/15.1 |
| 1,050,206 | 1/1913 | Crippen | 130/21 |
| 1,083,993 | 1/1914 | Crippen | 130/22 R |
| 1,253,167 | 1/1918 | Friberg | 130/24 |
| 1,731,142 | 10/1929 | Lee | 130/23 |

*Primary Examiner*—Russell R. Kinsey
*Attorney, Agent, or Firm*—Robert L. Farris

[57] ABSTRACT

A grain saving apparatus for a combine disposed at the discharge end of the combine includes a vaned member rotated relative to a straw support in the form of an open grate concave to receive a mixture of straw and grain from straw walkers in the separating sections of the combine and to change direction and velocity of movement of the material and direct it between the vaned member and straw support to separate grain and straw so that the heavier grain is collected for processing in the combine and the lighter straw is discharged by the vaned member to the rear of the combine.

3 Claims, 3 Drawing Figures

GRAIN SAVING APPARATUS

BACKGROUND OF THE INVENTION

This invention relates to combine harvesters and more particularly to grain saving apparatus for separating grain and straw at the discharge end of the combine.

In combine harvesting operations, most of the grain is separated in the threshing concave or in the separating section which includes straw walkers. However, an appreciable quantity of grain is carried by the straw on the straw walkers and is discharged from the combine to the ground.

Prior efforts to salvage the grain from the exhausting straw have required the use of conveyors to transport the salvaged grain back to the separating section of the combine which results in added cost and complexity of the machine.

SUMMARY OF THE INVENTION

It is an object of the invention to provide a combine harvester in which material discharged from the straw walkers at the rear of the combine is further separated so that grain is returned to the combine and straw is discharged.

A further object of the invention is to provide a combine harvester having a separating apparatus disposed to receive material discharged from the straw walkers and to separate the straw and grain so that the grain is returned to the combine for further processing without requiring the use of additional conveyors.

A combine harvester is provided in which apparatus is disposed to receive material discharged from the straw walkers at the discharge end of the combine and which will further separate grain from the straw, the apparatus being located adjacent the discharge end of the straw walkers and above the usual grain collecting pans so that it may be returned by way of the grain collecting pans to the cleaning section of the combine. The separating apparatus includes a rotor which coacts with a concave so that the coaction between the two tends to separate grain from the straw and also, the straw and grain mixture is moved at a greater velocity than it is being conveyed by the straw walkers so that the lighter straw is impelled rearwardly and the heavier grain drops through the open grate of the concave where it can be collected and returned to the cleaning section. Preferably, the grain collecting arrangement is in the form of the usual grain collecting pans which are disposed not only under the straw walkers but also the separating arrangement so that the separated grain is transported without requiring additional conveyor to elevate the material to a location where it can be reprocessed in the combine.

DETAILED DESCRIPTION

Figure 1:
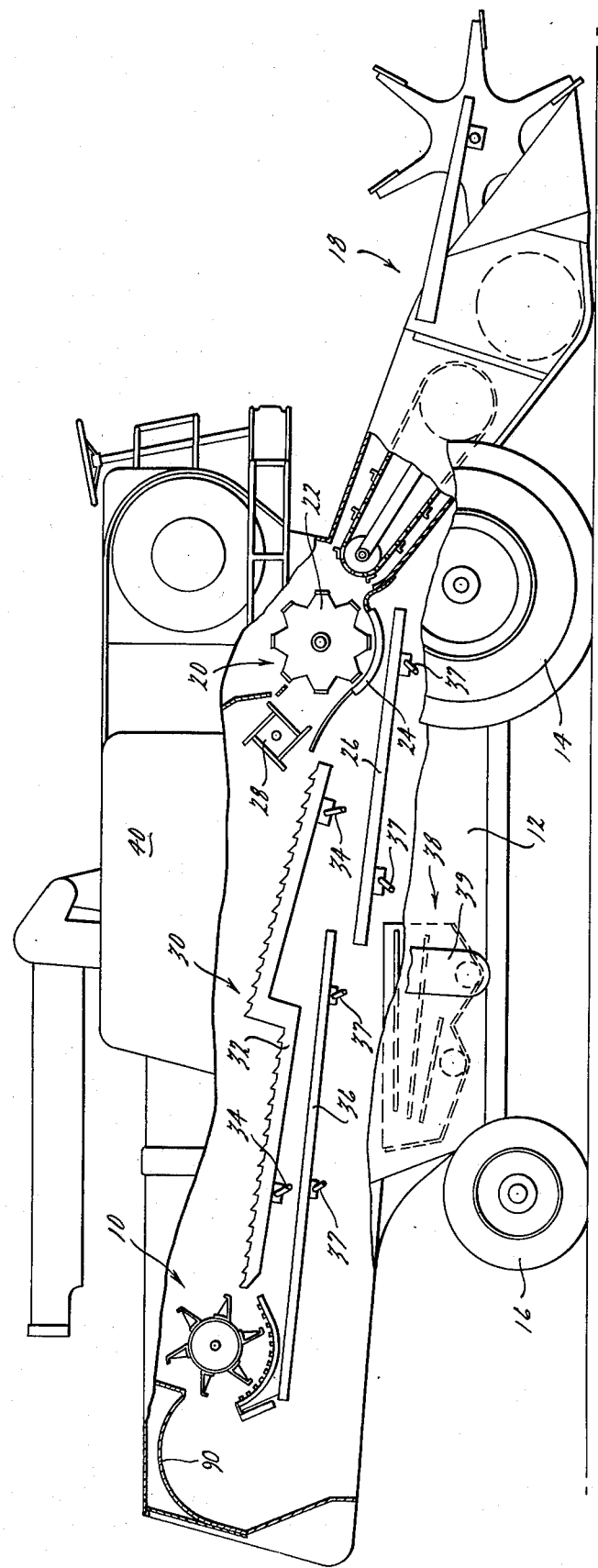
FIG. 1 is a side elevation of a combine with portions broken away and incorporating the grain saving apparatus embodying the invention.

Referring to FIG. 1, a combine is shown which has a grain saving apparatus embodying the invention indicated generally at 10. The grain saving apparatus 10 is mounted within a combine body 12 which is supported relative to the ground by front driving wheels 14 and rear steering wheels 16. A header assembly 18 is carried at the forward end of the combine for cutting crop and conveying the cut crop upwardly and rearwardly to a threshing apparatus 20 enclosed in the body 12.

The threshing apparatus 20 includes a cylinder 22 which cooperates with a concave unit 24 to thresh grain from the incoming cut crop material received from the header assembly 18. A majority of the grain is removed from the cut crop material and grain drops through openings in the concave 24 onto a reciprocating grain pan 26. The remainder of the crop material which is a mixture of grain and stalk or straw, is conveyed rearwardly of the machine by a rotating beater 28 to a separating section indicated at 30.

The separating section 30 includes longitudinally extending straw walkers 32 which are mounted on rotating cranks 34 for movement to agitate the mixture of straw and grain being urged rearwardly so that grain drops between the straw walkers 32 to the forward grain pan 26 and to a rearward grain pan 36 disposed below the walkers 32. At the same time, the straw walkers 32 support and advance the mixture of straw and any remaining grain rearwardly of the combine.

The grain collecting pans 26 and 36 will contain a mixture of grain, chaff and smaller bits of refuse material. The pans 26 and 36 are reciprocated by pivoting arms 37 and the bottoms of the pans are formed so that material in pan 36 moves forwardly and material in pan 26 moves rearwardly of the machine. The material drops from the pans to a shaker shoe assembly 38 which receives the material for cleaning. Clean grain is collected and transported by a conveyor 39 to a grain tank 40 where the grain is temporarily stored.

The material which is conveyed rearwardly by the straw walkers 32 will contain a certain amount of grain mixed with the straw. The purpose of the grain saver apparatus embodying the present invention is to separate and collect the remaining grain from the straw which otherwise would be discharged with the straw and be lost to the combine operation.

The grain saver 10 is disposed adjacent the rearward end of the straw walkers 32 and includes a rotor 42 and a straw support 44.

Figure 2:
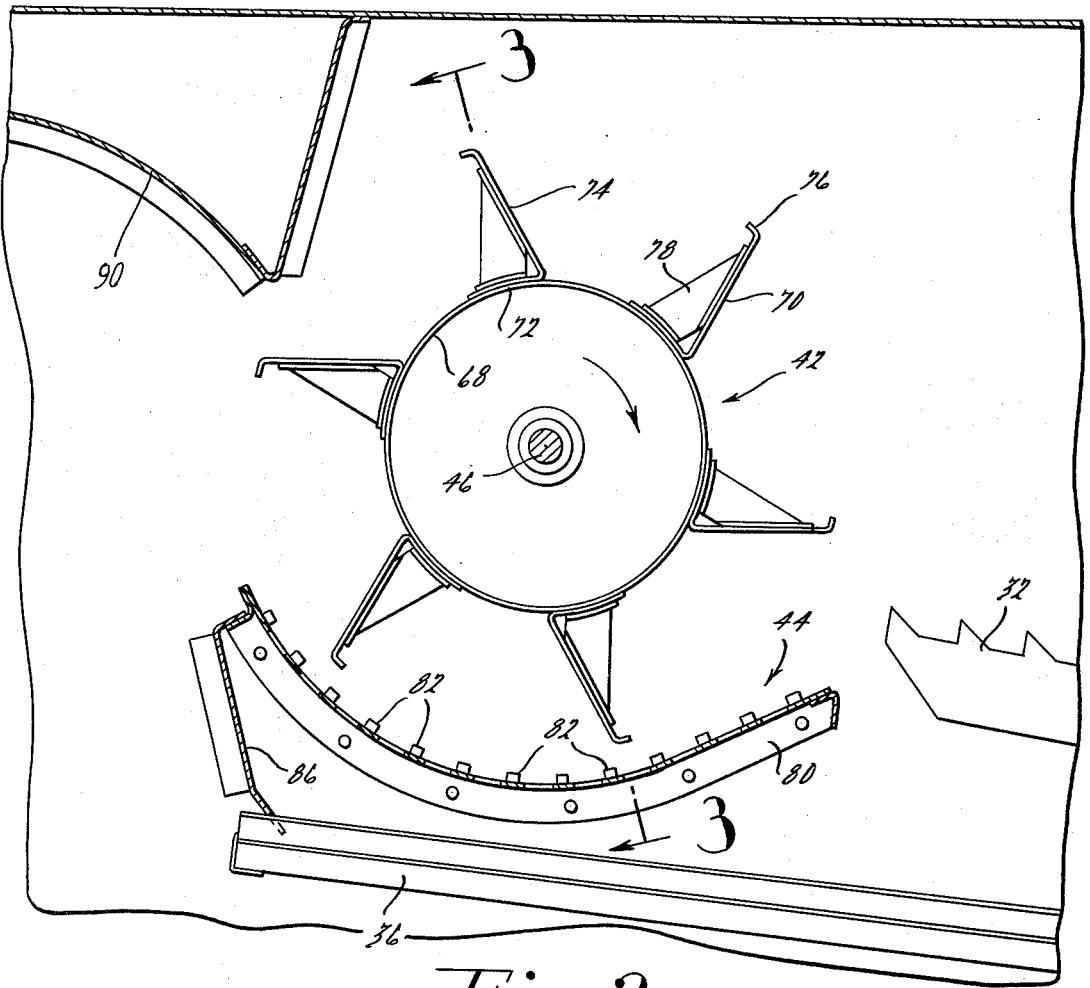
FIG. 2 is an enlarged view of the grain saving apparatus shown in FIG. 1 with portions shown in section.
Figure 3:
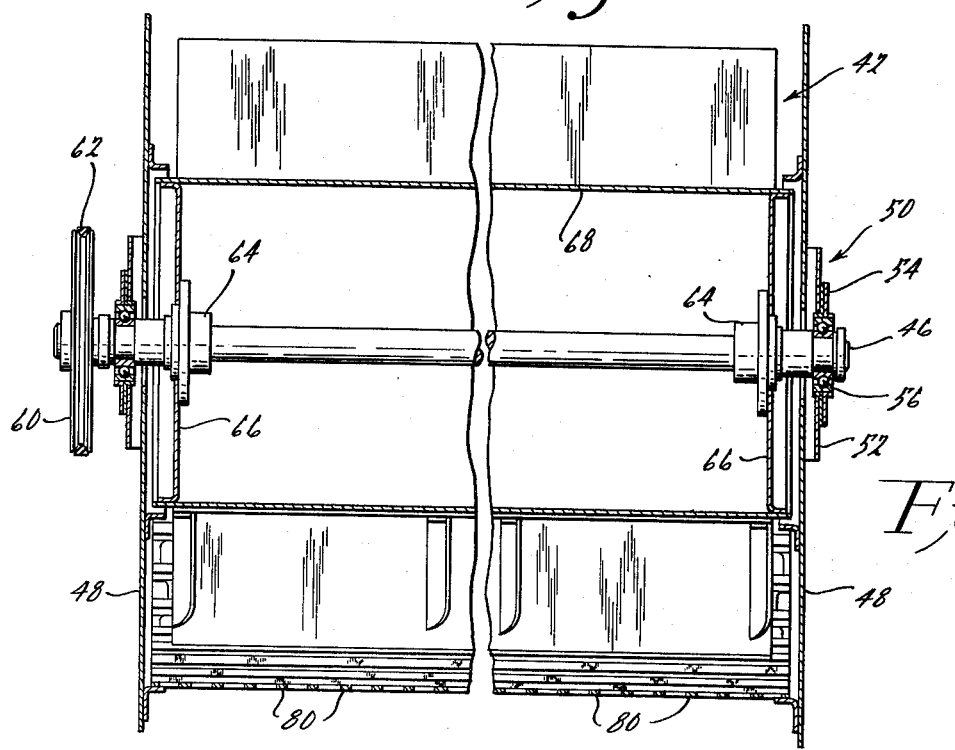
FIG. 3 is a section taken on line 3—3 in FIG. 2.

Referring now to FIGS. 2 and 3, the rotor 42 includes a rotatable shaft 46 which extends transversely of the machine and has its opposite ends protruding through panels 48 forming the side walls of the machine. Opposite ends of the shaft 46 are journaled in bearing assembly 50 mounted on the exterior of the walls 48. Each of the bearing assemblies 50 include a bearing support bracket 52 fastened in any conventional manner to the wall 48. A flanged member 54 is secured to the bracket 52 and supports a ball bearing 56 which receives the shaft 46. One end of the shaft 46 is provided with a pulley 60 which receives a driving belt 62 which serves to rotate the pulley 60 from a drive arrangement receiving its rotational movement from the engine of the machine which is not shown.

Mounted for rotation with the shaft 46 are a pair of collars 64 to which are connected end portions 66 of a cylinder 68. The end members 66 and cylinder 68 form a drum, the outer peripheral portion of which supports a plurality of vanes 70. The vanes 70 extend transversely for substantially the full length of the drum and are generally L-shaped in cross-section. The shorter leg 72 of each of the vanes 70 is fastened to the cylinder 68 in any conventional manner and the longer leg 74 of the vanes extend outwardly in diverging relationship to an imaginary plane passing through the shaft 46, as best seen in FIG. 2.

The cylinder 68 is rotated in a clockwise direction as viewed in FIG. 2 and the outer end of the vanes 70 are provided with relatively narrow flanges 76 which extend the full length of each of the vanes. The vanes 70 are reinforced by a plurality of braces 78 which are spaced longitudinally of the drum.

The straw support 44 is generally arcuate in longitudinal cross-section and is made up of a plurality of arc members 80 which are uniformly spaced transversely of the machine. The upper surface of the arc members 80 support a plurality of uniformally spaced bars 82 which extend transversely for the substantial width of the cavity between the walls 48. The arc members 80 are so formed that at least some of the bars 82 are disposed substantially concentrically to the shaft 46. The spacing between the bars 82 and between the arc members 80 form grain escape passages.

The straw support 44 is supported in a stationary position beneath the rotor 42 and above the rear grain pan 36. The rear portion of the straw support 44 is provided with a shield 86 which depends downwardly from the straw support 44 to the rear grain pan 36.

During operation, the mixture of straw and grain which is being conveyed rearwardly by the straw walkers 32 is formed into a substantially flat mat which extends for the full width of the cavity between the walls 48. The rearwardly moving mat of straw and grain material is discharged from the rear portion of the straw walkers 32 and is engaged by the rotating vanes 70 which serves to move the mat of material rearwardly and downwardly toward the stationary straw support 44. The drum rotor 42 is rotated in a clockwise direction, as viewed in FIGS. 1 and 2, so that the peripheral ends of the vanes 70 move at a greater velocity than the moving material on the straw walkers 32. As a result, the vanes 70 accelerate the material into the passage between the rotor 42 and straw support 44. Such acceleration and change of direction of the material, together with the coaction of the vanes 70 with the bars 82 of the straw support 44, serves to separate the heavier grain from the lighter plant material or straw. The lighter straw is conveyed rearwardly where it is discharged against an arcuate deflector 90 and is discharged downwardly toward the ground. The grain which is heavier than the straw resists the acceleration and change of direction of the straw and becomes separated therefrom so that it drops through the openings of the grate formed by the arc members 80 and bars 82 onto the rear grain pan 36 from which the grain is conveyed for further processing to the shaker shoe 38.

A grain saver apparatus for a combine has been provided which includes a rotor arrangement cooperating with an arcuate straw support forming an open grate concave disposed rearwardly at the discharge end of the straw walkers which convey a mixture of straw and grain rearwardly in the combine. The rotor is rotated so that its peripheral speed is greater than the material being moved by the straw walkers and also accelerates and changes the direction of movement of the material. This together with the action of the rotor vanes in proximity to the concave straw support tends to separate the lighter straw and the heavier grain so that straw is discharged from the rear of the machine and grain is directed through the concave to grain collecting pans where it is recollected and transported by the existing grain pans for further processing in the combine. This results in salvaging of grain which otherwise would be lost if the material was discharged from the straw walkers directly to the ground.

We claim:

1. An agricultural combine harvester with a mobile frame; threshing means mounted on the forward portion of the frame; a cleaning means mounted on the rear section of the frame; and an improved separating means including a plurality of straw walkers mounted to the rear of the threshing means and generally above the cleaning means on cranks rotatably supported on the frame, for receiving straw and threshed grain from the threshing means, conveying the straw to the rear of the harvester and separating grain from the straw, a straw support with apertures for the passage of grain mounted in a stationary position adjacent the discharge end of the plurality of straw walkers, a rotor member rotatably mounted on the frame above the straw support and adjacent the discharge end of the straw walkers for rotation about an axis parallel to the axes of said cranks, said rotor including a plurality of plate members extending generally radially from its axis of rotation, drive means to rotate the rotor member about its axis and thereby cause the radially extending plate members to engage straw and threshed grain leaving the straw walkers, to accelerate the straw and threshed grain and move it along the upper surface of the straw support and then convey the straw out of the harvester, and grain pan means mounted on the frame under the straw walkers and the straw support for collecting grain separated from the crop material by the straw walkers and the straw support and the rotor member and conveying the collected grain to the cleaning means.

2. The combination of claim 1 in which said stationary straw support includes a plurality of bar elements disposed transversely of said combine harvester in spaced relationship to each other, the spacing between adjacent bar elements forming said apertures for the passage of grain.

3. The combination of claim 2 in which at least some of said bar elements are disposed concentrically with the axis of said rotor member.

* * * * *